United States Patent [19]
VanCauter et al.

[11] Patent Number: 5,198,670
[45] Date of Patent: Mar. 30, 1993

[54] SCINTILLATION COUNTING SYSTEM FOR IN-SITU MEASUREMENT OF RADIOACTIVE SAMPLES IN A MULTIPLE-WELL PLATE

[75] Inventors: Gustaaf C. VanCauter, Middletown, Conn.; Donald E. Osten, Bolingbrook; John D. Tomisek, Lombard, both of Ill.

[73] Assignee: Packard Instrument Company, Downers Grove, Ill.

[21] Appl. No.: 414,678
[22] Filed: Sep. 29, 1989
[51] Int. Cl.$^5$ ................... G01N 1/20; G01N 1/204
[52] U.S. Cl. .................... 250/328; 250/364; 250/366
[58] Field of Search ............. 250/328, 369, 362, 364, 250/366

[56] References Cited

U.S. PATENT DOCUMENTS

| | | | |
|---|---|---|---|
| 3,319,792 | 5/1967 | Leder et al. | 210/238 |
| 3,796,879 | 3/1974 | Obrycki | 250/362 |
| 3,838,978 | 10/1974 | Eddleman et al. | 23/292 |
| 3,888,770 | 6/1975 | Avital et al. | 210/238 |
| 3,999,068 | 12/1976 | Stabile | |
| 4,057,148 | 11/1977 | Meyer et al. | 250/328 |
| 4,167,875 | 9/1979 | Meakin | 73/421 |
| 4,245,042 | 1/1981 | Weinstein et al. | 435/30 |
| 4,271,139 | 6/1981 | Hart | 424/1 |
| 4,298,796 | 11/1981 | Warner et al. | 250/328 |
| 4,528,450 | 7/1985 | Valenta | 250/362 |
| 4,651,006 | 3/1987 | Valenta | 250/362 |
| 4,735,718 | 4/1988 | Peters | 210/321 |
| 4,916,320 | 4/1990 | Wunderley et al. | 250/364 |

FOREIGN PATENT DOCUMENTS

| | | |
|---|---|---|
| 203048 | 11/1986 | European Pat. Off. |
| 1241001 | 3/1967 | Fed. Rep. of Germany ...... 250/364 |
| 4760 | 5/1990 | PCT Int'l Appl. |

OTHER PUBLICATIONS

"Introducing the Bellow Microharvester" Bellco Glass, Inc., Vineland, N.J., undated.
"Automatic Sample Processing and Filter Counting System INB-384" Inotech., Dunn Laboratechnik, undated.
1205 Betaplate System, Pharmacia/LKB, undated.
Siegenthaler, "Electronic Elimination of Noise Pulses in Scintillation Counting" Nuclear Instruments and Methods, North Holland Publishing Co. 1969, pp. 173–186.
Potter, et al. "A Liquid Scintillation Counter Specifically Designed for Samples Deposited on a Flat matrix", Phys. Med. Biol., 1986, vol. 31, No. 4 361–369.
Mackey, et al. "High-Efficiency Solid Scintillatin Radioactivity Detection for High Performance Liquid Chromatography," Journal of Chromatography, 208 (1981) 1–8.
Landis, et al. "The Application of Pulse-Shape Discrimination to Separating Phototube Noise Pulses from Scintillation Pulses", University of California, 1964, UCRL-11301.
Colmenares, et al., "A Europium-Doped, Calcium--Fluoride Scintillator System for Low-Level Tritum Detection", Nuclear Instruments and Methods, 114, (1974) pp. 277–289.

Primary Examiner—Carolyn E. Fields
Attorney, Agent, or Firm—Arnold, White & Durkee

[57] ABSTRACT

A system for in-situ measurement of the radioactivity of multiple samples while the samples are in a multiple-well sample tray, with a scintillator in each sample-containing well for producing light pulses in response to radiation from the respective samples. Multiple photomultiplier tubes are positioned adjacent to the sample wells containing the scintillator for simultaneously measuring the radioactivity of multiple samples with only a single photomultiplier tube sensing the scintillations from each well and converting the sensed scintillations into corresponding electrical pulses. The electrical pulses from each photomultiplier tube are processed to discriminate between pulses attributable to sample events within the wells and pulses attributable to non-sample events such as photomultipler tube noise. The discrimination is effected by determining whether a selected number of electrical pulses occurs within a prescribed time interval, the occurrence of the selected number of pulses within the prescribed time interval signifying a sample event. Only the electrical pulses attributable to sample events are supplied to a pulse analyzer.

16 Claims, 2 Drawing Sheets

SCINTILLATION COUNTING SYSTEM FOR IN-SITU MEASUREMENT OF RADIOACTIVE SAMPLES IN A MULTIPLE-WELL PLATE

BACKGROUND OF THE INVENTION

The present invention relates generally to radiometric analysis systems and, more particularly, to such systems which utilize liquid scintillators for detecting radiation from radioactive samples.

The use of multiple-sample trays or plates for cell cultures and the like has become commonplace in the field of biotechnology. In many situations, the cell cultures are labeled with radioactive isotopes, and thus the radioactivity of the final samples must be measured. This is often a time-consuming and burdensome process because of the large number of samples involved. For example, in one of the most commonly used multiple-well plates, a total of 96 samples are contained in each plate. Of course, each of these multiple samples must be separately measured.

Systems that have been previously proposed for measuring the radioactivity of such samples typically require multiple steps which render the process time-consuming and, therefore, costly. For example, U.S. Pat. No. 4,298,796 describes a system for measuring the radioactivity of such samples by first removing the samples from the tray or plate in which the cells are cultured, resulting in the transfer of the samples to a filter mat. The filter mat is then enclosed in a container which includes a liquid scintillator, and the individual samples are measured while disposed within the container. The only presently known commercial version of this system utilizes two photomultiplier tubes for detecting the light scintillations attributable to each individual sample, so that the sample can be measured using the well known coincidence detection technique commonly used in liquid scintillation spectrometers.

SUMMARY OF THE INVENTION

It is a primary object of the present invention to provide an improved scintillation counting system which is capable of measuring the radioactivity of multiple samples directly in the multiple-well tray or plate in which such samples are normally cultured or otherwise prepared. In this connection, a related object of this invention to provide such an improved scintillation counting system which eliminates virtually all sample handling prior to measurement of the radioactivity levels of the samples.

Another important object of this invention is to provide an improved scintillation counting system which is capable of simultaneously counting multiple samples directly in the multiple-well plate in which the samples are prepared, thereby attaining high sample throughput rates.

It is another object of this invention to provide such an improved scintillation counting system which is extremely fast and easy to use, regardless of the number of samples contained in the multiple-well tray or plate.

A still further object of this invention is to provide such an improved scintillation counting system which uses only a single photomultiplier tube to measure the radioactivity of each sample.

Other objects and advantages of the invention will be apparent from the following detailed description and the accompanying drawings.

In accordance with the present invention, the foregoing objectives are realized by providing a system for in-situ measurement of the radioactivity of multiple samples while the samples are in a multiple-well sample plate in which the samples are cultured or otherwise prepared. A scintillator is provided in each sample-containing well, and multiple photomultiplier tubes are positioned adjacent the sample wells containing the scintillator for simultaneously measuring the radioactivity of multiple samples. Only a single photomultiplier tube senses the scintillations from each well and converts the sensed scintillations into corresponding electrical pulses. The electrical pulses from each photomultiplier tube are processed to discriminate between pulses attributable to sample events within the wells and pulses attributable to non-sample events such as photomultiplier tube noise. The discrimination is effected by determining whether a selected number of electrical pulses occur within a prescribed time interval, with the occurrence of the selected number of pulses within the prescribed time interval signifying a sample event. The electrical pulses attributable to sample events are supplied to a pulse analyzer which evaluates the number and energy level of the pulses attributed to each sample.

Figure 1:
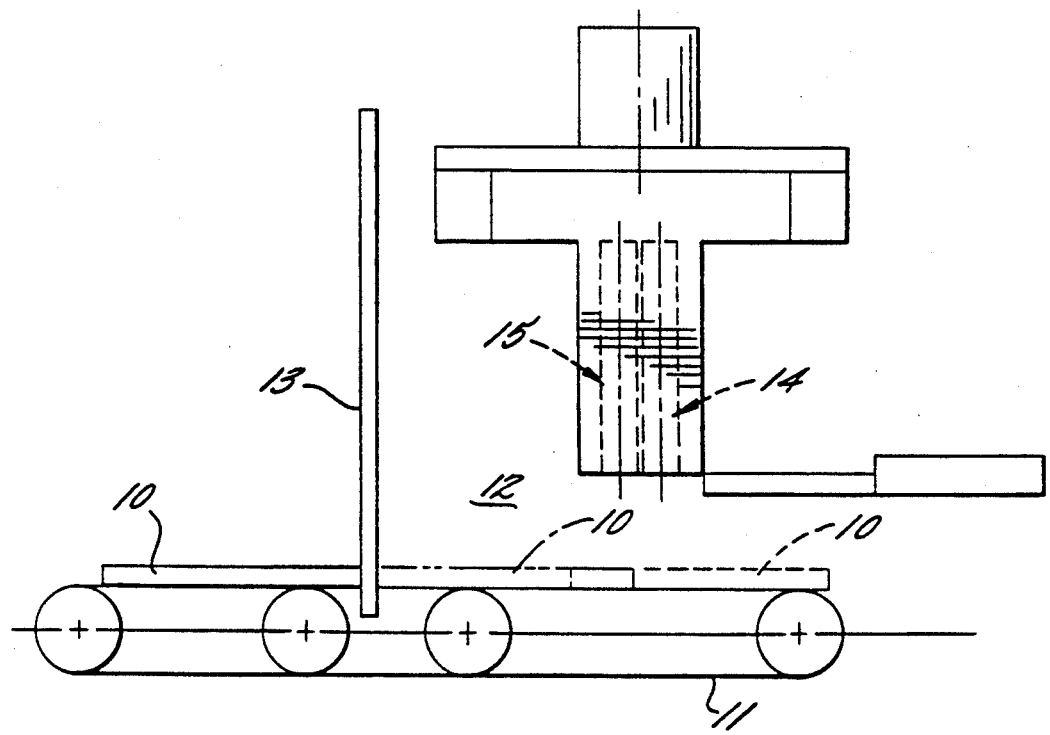
FIG. 1 is a diagrammatic top plan view of a scintillation counting system embodying the invention for measuring the radioactivity of samples in a 96-well plate.
Figure 2:
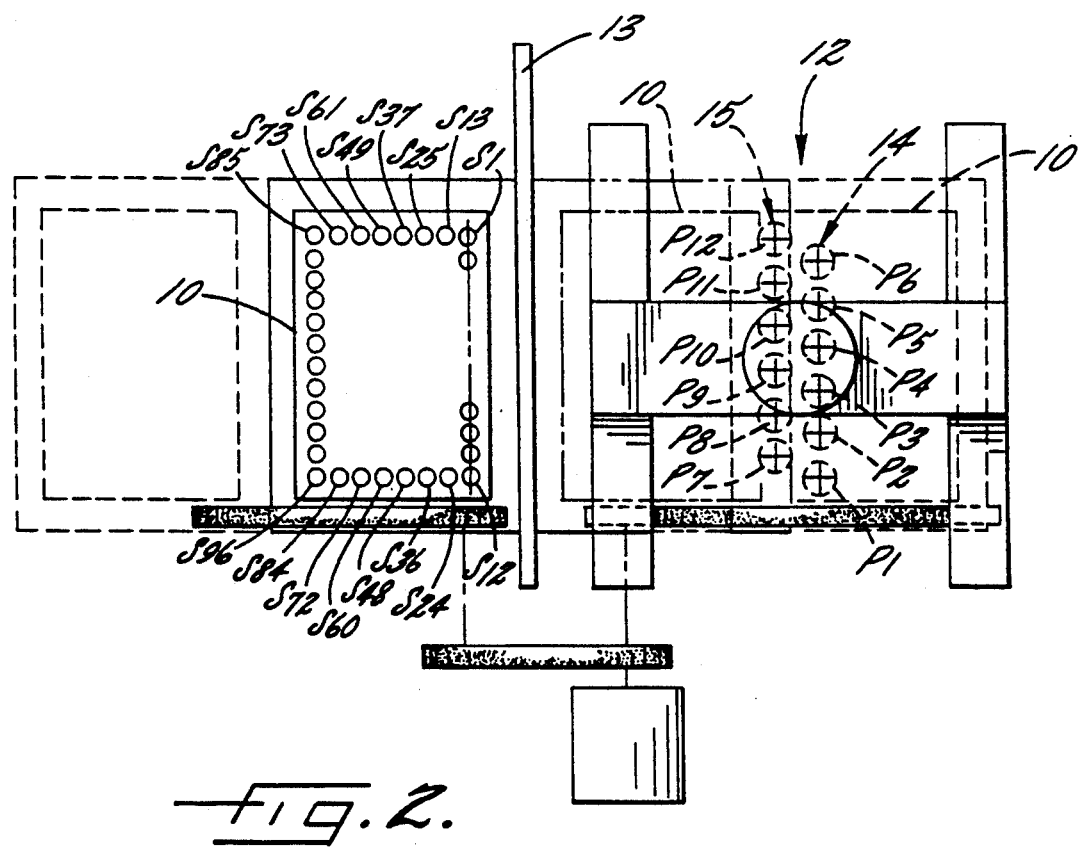
FIG. 2 is a side elevation of the system shown in FIG. 1.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Turning now to the drawings and referring first to FIG. 1, there is shown a scintillation spectrometer for measuring the radioactivity levels of multiple samples contained in a sample plate 10 having multiple sample wells S1–S96. In the particular example illustrated, the wells are arranged in eight rows, each containing twelve wells. The plate 10 is loaded by a conveyor 11 into a light-tight counting chamber 12 via a conventional shutter mechanism 13 which is opened and closed to permit ingress and egress of successive sample plates.

Within the counting chamber, the multi-well plate 10 is indexed beneath two rows 14 and 15 of photomultiplier tubes (PMT's) P. In the particular embodiment illustrated, the PMT's P are arranged in two rows, each containing six PMT's, for counting samples in a 96-well plate forming an 8×12 matrix of sample wells. As can be seen in FIG. 1, the two rows of PMT's P1–P6 and P7–P12 are staggered relative to each other so that the PMT's in one row are aligned with alternate wells in one of the twelve-well rows, while the PMT's in the other row are aligned with the intervening wells in an adjacent twelve-well row. Consequently, after any given twelve-well row has been passed under both rows of PMT's P-1-P-12, the samples in all twelve wells in that row will have been counted.

The multiple-well sample plate is periodically indexed beneath the twelve PMT's so that each sample well is eventually positioned directly beneath one of the PMT's for counting. Thus, if the plate contains eight rows of sample wells S1-S12, S13-S24, S25-S36, S37-S48, S49-S60, S61-S72, S73-S84 and S85-S96, the plate is initially positioned with wells S2, S4, S6, S8 and S10 in the first row aligned with the second row of six PMT's P7-P12. After the samples in those six wells are counted, the tray is indexed to advance the tray by one row, so that wells S1, S3, S5, S7, S9 and S11 in the first row aligned with the first row of PMT's P1-P6, and wells S2, S4, S6, S8, S10 and S12 in the second row aligned second row of PMT's P7-P12.

The use of two rows of PMT's to count a single row of samples is beneficial in that it permits the use of larger PMT's than would be possible if all the PMT's were in a single row. In general, the larger PMT will provide better efficiency because it is capable of detecting more photons. With the arrangement illustrated, two rows of half-inch PMT's can be used to count the samples in a standard 96-well plate with only nine indexing steps.

Each of the 96 sample wells is provided with a scintillator that converts radiation such as beta particles into corresponding light pulses. As will be described in more detail below, the scintillator may be provided in a variety of different forms. In the preferred embodiment of the invention, a predetermined amount of a liquid scintillation cocktail is placed in each sample well before the sample plate is loaded into the counting chamber 12. Then, as the radionuclide in the sample decays, the resulting beta particles energize the fluor contained within the liquid scintillation cocktail. The fluor converts the energy from the beta particles into optical events which are detected by the corresponding PMT. The PMT in turn produces an electrical output signal corresponding to the detected optical events, and this signal is processed electronically to determine the radioactivity level of the sample.

Figure 3:
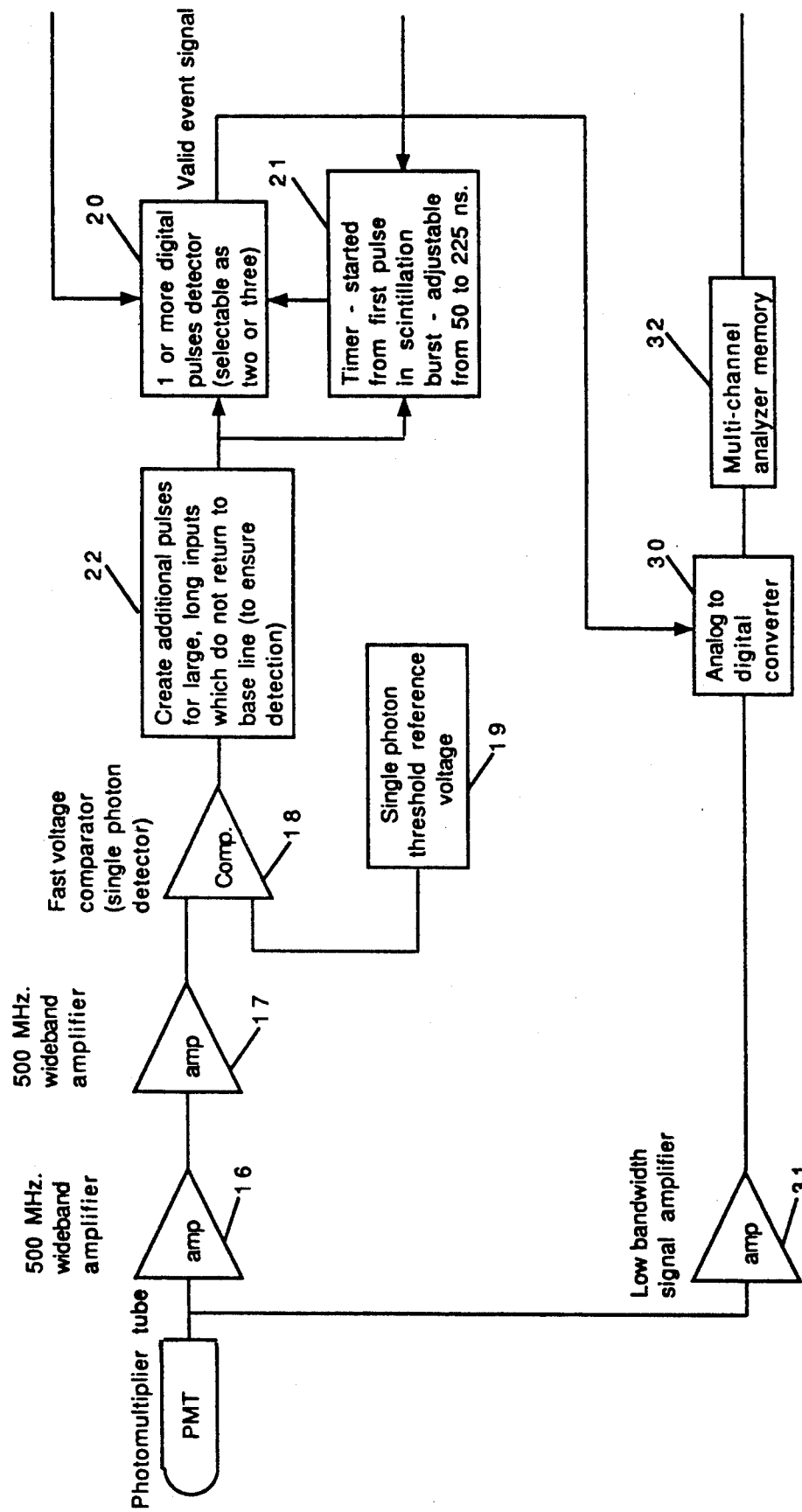
FIG. 3 is a block diagram of the electronic signal processing system associated with each of the photomultiplier tubes used in the system of FIGS. 1 AND 2.

As illustrated in FIG. 3, the output of each of the twelve PMT's is passed through a pair of amplifiers 16 and 17 to a comparator 18 which serves as a single photon detector. More specifically, the comparator 18 receives a reference voltage from a single-photon threshold reference source 19, and produces an output pulse only when the input signal from the PMT exceeds the threshold set by the reference voltage. These output pulses from the comparator 18, sometimes referred to as "singles" pulses, indicate that the amplitude of the detected pulse is large enough to represent at least a single photoelectron.

The output pulses from the comparator 18 are fed to a burst pulse counter 20, which functions to sum the "singles" pulses received from the comparator. The counter 20 sums the received pulses during a time interval set by a timer 21 which is started by the first pulse in each scintillation burst. As is well known, each beta particle produces a burst of photons in the liquid scintillator, and thus each "scintillation" attributable to a single beta particle is actually a burst of scintillations produced within a brief time interval. The duration of the time interval is a function of the scintillation decay constant of the particular scintillator used. Each photon is capable of causing the generation of a separate electrical pulse from the PMT, and thus the PMT converts each burst of scintillations into a corresponding burst of electrical pulses.

When a sample decay event has a high energy level, the photomultiplier signal to the comparator 18 can remain above the threshold level set by the reference signal throughout a major portion of the pulse burst; as a result, the pulse counter 20 might never detect more than a single pulse, even though a burst of numerous pulses is actually produced by the scintillator and the PMT. To avoid this situation, a pulse generation circuit 22 produces a set of pulses in response to a sustained output from the comparator 18. This set of pulses is supplied to the pulse counter 20 so that the corresponding PMT output will be treated as a sample event.

Whenever the counter 20 receives two or more pulses within the time period set by the timer 21, the counter produces an output signal which enables an analog-to-digital (A/D) converter 30. The converter 30 also receives the PMT output via an amplifier 31 and, when the converter is enabled, it supplies the digital counterpart of the analog output of the PMT to the memory 32 of a conventional multi-channel analyzer.

The noise pulses produced by a PMT are typically single pulses rather than bursts of pulses. Thus, the signal processing system can discriminate between noise pulses and pulses attributable to sample events by determining whether any given pulse is part of a pulse burst. If the pulse in question is determined to originate in a burst caused by a sample decay event, the pulse burst is counted as a single sample event and is passed along to a pulse analyzer which determines the energy level of the pulse burst. If the pulse is deemed to originate from a noise event, the pulse is attributed to noise and ignored.

The signal processing system must detect at least two consecutive pulses within a prescribed time interval in order for any given pulse to be attributed to a sample event. To enable the detection of such consecutive pulses, the timer 21 enables the burst counter 20 to count consecutive pulses for a preselected time period. This time period is adjustable within a selected range, e.g., within the range of about 50 to about 225 nanoseconds, depending upon the particular scintillator utilized in the sample wells. When excited, scintillators release their energy over a period of time which varies with the scintillator. This time period is known as the "decay constant" or "decay time." Scintillators are generally classified as being "fast," indicating that the absorbed energy is released very quickly, or "slow", which indicates that the energy is given up over an extended period. As a consequence, the time period set by the timer 21 can be shorter for "fast" scintillators than for "slow" scintillators. In general, the timer should be set to a time period that is approximately three to four times the scintillation decay constant of the scintillator. For example, if a scintillator has a decay constant of 50 nanoseconds, the timer 21 is set to about 175 nanoseconds, which is 3.5 times the decay constant. (The rate of photons emitted by the scintillator in response to a single decay event is reduced by 50% in each time interval prescribed by the scintillation decay constant.)

Certain background events such as cosmic rays produce pulse bursts which will be detected as sample events in the system of this invention. However, the radioactive samples that are normally measured in a system of this type are sufficiently active that their decay events occur at a rate many times higher than the rate of occurrence of background events such as cosmic rays. Thus, the detection and counting of such background events has only a negligible effect on the final results of the sample measurements.

Noise pulses originating in the PMT's are single photoelectron thermal events, and thus are not detected as sample events. Moreover, the decay time of such noise pulses at the anode of the PMT (as determined by the PMT dynode chain circuit) can be limited to 10 to 15 nanoseconds, and thus such pulses are not likely to be detected as part of a pulse burst from a sample. Tube noise pulses are usually by far the most frequent background event, and thus discriminating between the pulse bursts produced by sample events and the single pulses from tube noise is particularly valuable. For example, tube noise pulses may occur at a rate of 500 to 1000 per minute, while cosmic rays typically occur at a rate of only 10 to 40 per minute.

The signal processing circuitry can normally distinguish consecutive pulses in a burst as separate pulses only when the pulses are spaced apart by more than about ten nanoseconds. This is sometimes referred to as the "pulse pair resolution time." Many of the scintillators normally used in liquid scintillation spectrometry are extremely fast, producing pulse bursts in which the component pulses are spaced apart by less than ten nanoseconds. Scintillators with longer decay constants, preferably at least 15 nanoseconds, are preferred. In general, most of the light emitted by a scintillator in response to a single decay event occurs in three or four decay constants. Thus, when a scintillator having a decay constant of 15 nanoseconds is utilized, setting the timer to 55 nanoseconds will permit multiple component pulses of a single burst to be detected.

One example of a liquid scintillation cocktail suitable for use in this invention contains diisopropyl naphthalene as the solvent and a fluor such as pyrene. A preferred cocktail of this type has 0.0992 gram of pyrene in 15 milliliters of diisopropyl naphthalene. In a test, this cocktail was labeled with 38,100 DPM carbon-14 toluene, and 500 microliters was pipetted into a sample well and counted with the pulse detection system of FIG. 3 circuit. The resulting spectrum had the characteristic shape of a beta spectrum, and the counting efficiency was 72%.

Another liquid scintillation cocktail suitable for use in this invention is a mixture of diisopropyl naphthalene and P-bis(O-methyl styryl)-benzene, referred to hereinafter as "bisMSB." A preferred cocktail of this type contains one gram of bisMSB for each liter of diisopropyl naphthalene. In a test, this cocktail was labeled with tritiated thymidine and counted with the pulse detection circuit of FIG. 3. A counting efficiency of 7.87% was obtained.

If desired, the scintillator can be a solid rather than a liquid. For example, scintillator beads of cerium-doped yttrium silicate or calcium fluoride can be used in a scintillation proximity radioimmunoassay carried out in a multiple-well sample tray, as described in more detail in the assignee's copending U.S. patent application Ser. No. 444,297 filed Dec. 1, 1989 for "Scintillation Proximity Radioimmunoassay Using Solid Scintillator Support Body." The beads of scintillator are extremely small, e.g., 10 microns, and thus numerous beads are contained in each sample well. The doped yttrium silicate has a scintillation decay constant of 56 nanoseconds, and calcium fluoride has a scintillation decay constant of 1000 nanoseconds. Solid scintillators may also be used to form the walls of the sample wells, or just portions of the walls such as the bottoms of the wells, rather than being used in the form of beads. Alternatively, a stable layer of solid scintillator may be deposited on the bottoms of the sample wells. Yet another form of scintillator suitable for use in this invention is reversible between the solid and liquid states.

We claim:

1. A method for in-situ measurement of the radioactivity of multiple beta-emitting samples while the samples are in a multiple-well sample tray in which each well is open at its upper end, said method comprising
   providing a scintillator in the lower portion of each sample-containing well where the scintillator is directly exposed to the beta emissions from the respective samples for producing light pulses in response to said beta emissions,
   positioning multiple photomultiplier tubes adjacent to the open upper ends of said sample wells containing said scintillator for simultaneously measuring the radioactivity of multiple samples with only a single photomultiplier tube sensing the scintillations from each well and converting the sensed scintillations into corresponding electrical pulses, the face of each photomultiplier tube covering substantially the entire open upper end of the corresponding sample well,
   processing the electrical pulses from each photomultiplier tube to discriminate between pulses attributable to sample events within said wells and pulses attributable to non-sample events such as photomultiplier tube noise, said discrimination being effected by determining whether a selected number of electrical pulses occurs within a prescribed time interval, the occurrence of said selected number of pulses within said prescribed time interval signifying a sample event, and
   supplying only the electrical pulses attributable to sample events to a pulse analyzer.

2. The method of claim 1 wherein said photomultiplier tubes are arranged in multiple rows in which each tube is aligned with one of the sample wells in said tray, and successively indexing s id tubes and said tray relative to each other to measure the radioactivity of all the samples in said tray.

3. The method of claim 2 wherein said photomultiplier tubes are arranged in at least two rows with the tubes in one row being staggered relative to the tubes in the other row so that the tubes in one row can be aligned with alternate sample wells in a row of sample wells in said tray, and the tubes in a second row can be aligned with the intervening sample wells in said row of sample wells.

4. The method of claim 1 wherein said samples in said wells are tritiated samples emitting low-energy beta particles.

5. The method of claim 1 wherein said selected number of electrical pulses is two or three pulses, and said prescribed time interval is within the range of about 50 to about 225 nanoseconds.

6. The method of claim 1 wherein said scintillator has a scintillation decay constant fluorescence lifetime in excess of about 15 nanoseconds.

7. The method of claim 1 wherein said scintillator is a liquid scintillation cocktail.

8. The method of claim 1 wherein said scintillator comprises a multiplicity of beads used in a scintillation proximity radioimmunoassay.

9. A scintillation counting system for simultaneously measuring the radioactivity of multiple radioactive samples, said system comprising a sample tray forming multiple sample wells arranged in an array of x columns and y rows, each of said wells being open at its upper end, a scintillator in each sample well for making direct contact with a sample placed therein and producing light pulses in response to radiation from said sample, multiple photomultiplier tubes ("PMTs") arranged in a matrix such that each PMT is aligned with a different one of said sample wells adjacent the open upper ends of the wells, and each sample well has only one PMT aligned with it, for converting the light pulses from the scintillators in the respective wells into corresponding electrical pulses, the face of each photomultiplier tube covering the entire area of the open upper end of the corresponding sample well, electronic signal processing means receiving said electrical pulses from said PMTs and determining whether a selected number of electrical pulses occurs within a prescribed time interval, the occurrence of said selected number of pulses within said prescribed time interval signifying a sample event, and a pulse analyzer receiving only the electrical pulses attributed to sample events.

10. The scintillation counter of claim 9 wherein said PMT's are arranged in multiple rows in which each PMT is aligned with one of the sample wells in said array, and which includes means for successively indexing said PMT's and said sample wells relative to each other to measure the radioactivity of all the samples in s id wells.

11. The scintillation counter of claim 10 wherein said PMT's are arranged in at least two rows with the PMT's in one row being staggered relative to the PMT's in the other row so that the PMT's in one row can be aligned with alternate sample wells in a row of sample wells, and the PMT's in a second row can be aligned with the intervening sample wells in said row of sample wells.

12. The scintillation counter of claim 9 wherein said selected number of electrical pulses is two or three pulses, and said prescribed time interval is within the range of about 50 to about 225 nanoseconds.

13. The scintillation counter of claim 9 wherein said scintillator has a scintillation decay constant in excess of about 15 nanoseconds.

14. The scintillation counter of claim 9 wherein said scintillator forms at least a portion of the walls of the sample wells.

15. The scintillation counter of claim 9 wherein said scintillator is deposited on the bottoms of the sample wells.

16. The scintillation counter of claim 9 wherein said scintillator is in the form of solid beads.

* * * * *